Jan. 16, 1968
A. LORRANCE
3,363,725
ARTICLE OF MANUFACTURE WITH RETRACTING
CASTERS AND THE LIKE
Filed Oct. 21, 1965
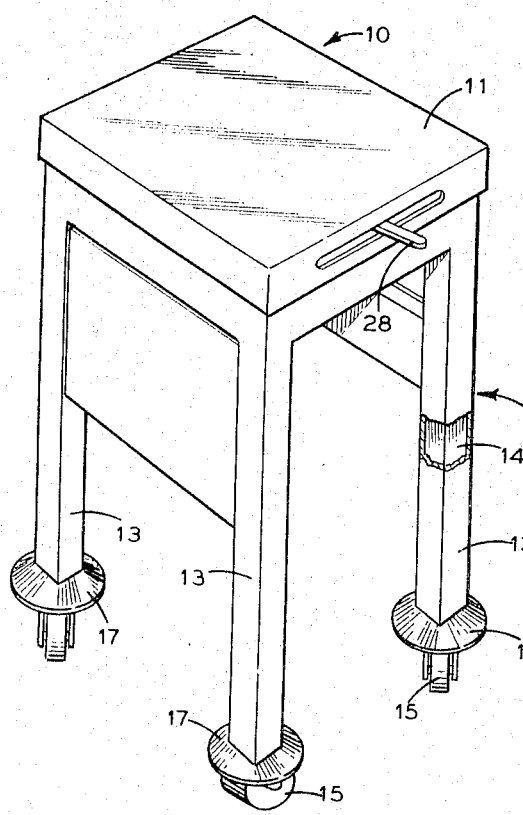
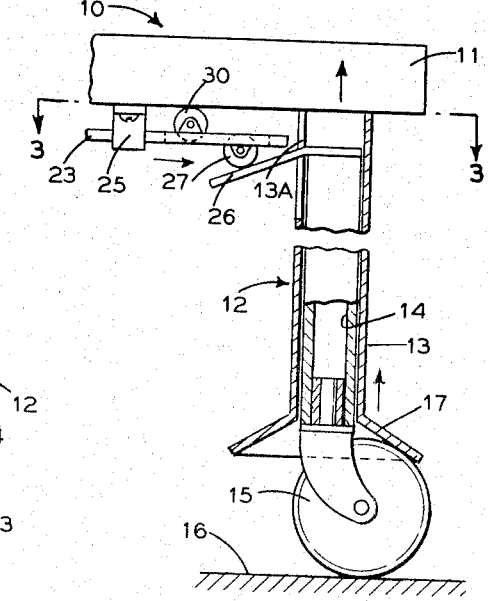
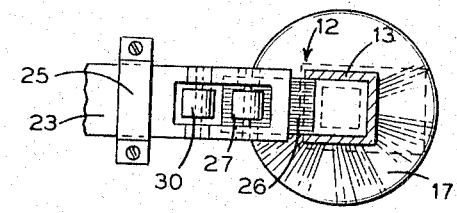
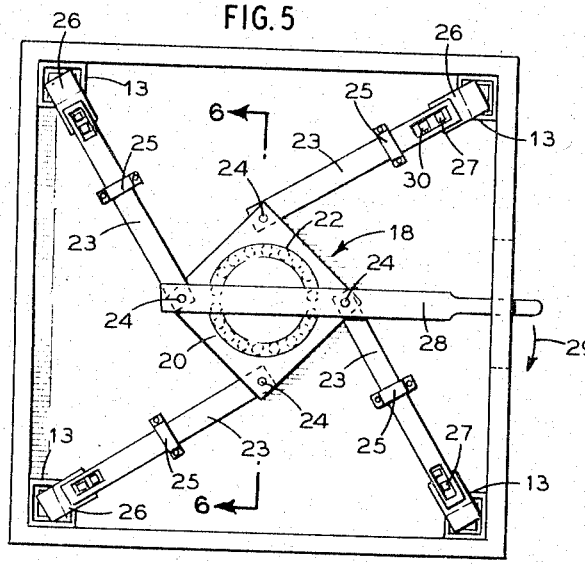
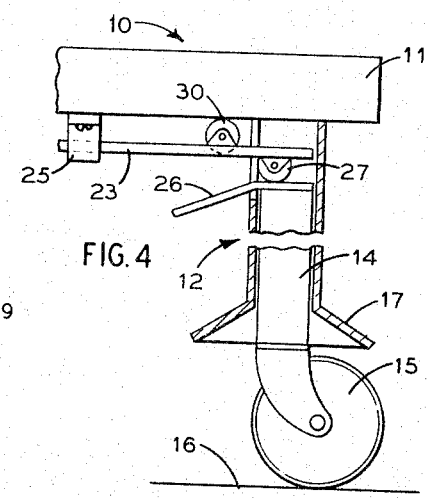
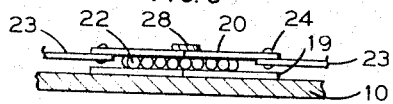
INVENTOR.
Arthur Lorrance
BY
*Irving Seidman*
ATTORNEY

United States Patent Office 3,363,725
Patented Jan. 16, 1968

3,363,725
ARTICLE OF MANUFACTURE WITH RETRACTING CASTERS AND THE LIKE
Arthur Lorrance, 73—28 197th St., Flushing, N.Y. 11366
Filed Oct. 21, 1965, Ser. No. 499,841
6 Claims. (Cl. 188—2)

This invention relates in general to an article of manufacture capable of being either rolled over a supporting surface or fixed in place thereon, and more specifically, to a wheeled article of manufacture having a leg construction and connected caster which is adapted to move between an extended and retracted position so as to effect a braking and unbraking of the caster accordingly.

Many articles of manufacture, as for example, chairs, tables, beds and the like, are constructed so as to be supported on casters so that the same may be readily wheeled or rolled over a supporting surface with ease. Usually such wheeled articles are free to roll whenever a force is exerted thereon. As a result, such articles are frequently subjected to unintentional or accidental movement whenever an unintentional force is applied thereto.

Consequently, numerous efforts have been devised to incorporate in such articles a means for effectively locking the casters against rotation whenever it is desired that the wheeled articles be held in place on a supporting surface. The known efforts, as evidenced by U.S. Patents 1,092,220, 1,626,819, 2,605,387 and 2,823,924, have resulted in relatively complicated and costly mechanisms to achieve this end.

It is therefore an object of this invention to provide an article of manufacture supported on caster means which can be readily locked and unlocked in a manner which is relatively simple and positive in operation.

It is another object of this invention to provide an article of manufacture having a plurality of supporting leg means and a connected caster whereby the respective casters may be simultaneously locked and unlocked against rotation in a simple and expedient manner.

It is another object of this invention to provide a wheeled article of manufacture having retractable wheel means whereby the wheels are locked against rolling in the retracted position thereof, and which in the extended position thereof are rendered free to rotate.

Another object of this invention is to provide a wheeled article having a plurality of telescoping leg means in which a caster is connected to the free end of the movable leg member whereby the respective leg means can be simultaneously actuated by means of an actuator in a manner which permits the respective casters to be extended so as to render them freely rotatable in the operative position thereof and retracted to lock or brake the casters against rotation in the inoperative position thereof.

Another object of this invention is to provide a wheeled article having retractable casters in which the casters are positively extended to their free wheeling position and are positively retracted within the respective leg means by the weight of the article supported thereby.

The above objects and other features and advantages of this invention are attained by a wheeled article of manufacture, as for example a table, bed or other wheeled article comprising a body having a plurality of leg means for supporting the body on a supporting surface. Each of the respective leg means includes a leg member fixed to the body and a movable leg member slidably connected thereto for movement between an extended and retracted position. A wheel means is operatively connected to the free end of the movable leg members, and a means is connected with the fixed member to effect a braking action on the wheel member so as to prohibit rotation thereof in the retracted position of said leg means, and which releases the wheel member for rotation in the extended position. An actuating means is operatively connected with each of the movable leg means for effecting simultaneous movement of the respective leg means between extended and retracted position so as to effect a release or braking of the wheel means accordingly.

In accordance with this invention, the actuating means comprises a bearing means connected to the body and it is operatively associated with each of the respective leg means through a plurality of operating links extending between the bearing means and each of the respective leg means. Complementary camming means are interposed between the operating links and the movable leg member of the associated leg means so that the movable leg member is extended or retracted upon the actuation of the actuating means. A suitable operating lever may be operatively connected to the bearing means so as to effect the actuation thereof.

A feature of this invention resides in the provision of an article of manufacture having a plurality of telescoping leg members which include a fixed member and a relatively movable member mounted for movement between extended and retracted position and having the wheel means connected to the end of the movable member and a braking means associated with the end of the fixed leg member whereby the wheel means is subjected to a braking action in the retracted position thereof and which wheel means is free to rotate in the extended position thereof.

Another feature of this invention resides in the provision of a wheeled article in which the weight of the body is utilized to effect retraction of the supporting leg means when the operating lever is moved to the retracted position thereof.

Another feature of this invention resides in the provision of means for positively maintaining the respective telescoping leg means in the extended position thereof so that the article of manufacture can be readily rolled over a supporting surface.

Other features and advantages will become more readily apparent when considered in view of the drawings and specification in which, FIGURE 1 illustrates a perspective view of an article of manufacture utilizing the concept of the instant invention.

FIGURE 2 illustrates a fragmentary sectional view of the leg construction of the instant invention illustrating the component parts thereof in the retracted position thereof.

FIGURE 3 is a plan view taken along line 3—3 of FIG. 2.

FIGURE 4 is a view similar to that of FIG. 2 but illustrating the arrangement of the component parts in the extended position thereof.

FIGURE 5 is a bottom plan view of the article of FIG. 1.

FIGURE 6 is a sectional view taken along line 6—6 on FIG. 5.

Referring to the drawings, there is shown in FIGS. 1 through 5 an article of manufacture 10 embodying the instant invention. In the illustrated form of the invention, the article of manufacture is illustrated as comprising a table. However, it will be readily understood that the inventive concept disclosed herein may be applicable to any other wheeled type article or furniture, as for example, a desk, dresser, bed, chair and the like, which is desirous of being supported in rolling engagement with a supporting surface or floor. However, for purposes of description, the instant invention will be described as applied to a table structure.

As shown, the article of manufacture or table 10 comprises a body portion or table top 11 supported on a plurality of leg means 12. Each of the respective leg means 12 comprises a tubular or first leg member 13 which is rigidly secured to the body 11 of the article. In accordance with this invention, a second leg member 14 is slidably disposed within each of the fixed tubular members 13 so as to be telescopically mounted for movement between an extended position, as noted in FIG. 4, and a retracted position as seen in FIG. 2. Connected to the free end of each of the respective movable leg members 14 is a caster or wheel 15 for supporting the article or table 10 in rolling engagement over a supporting surface 16.

As illustrated, the movable leg member 14 is mounted within the complementary fixed leg portion 13, and accordingly, the fixed leg portion 14 is provided adjacent the free end thereof with an outwardly flaring end portion 17 which is adapted to engage the periphery of the wheel or caster 15 in the retracted position thereof as shown in FIG. 2. As will be hereinafter described, the weight of the article 10 causes the flared end 17 to bear against the respective casters 15 and the friction therebetween functions as a brake which prohibits rotation of the wheel or caster 15. Accordingly, with the leg means 12 retracted, the table 10 is held in place on a supporting surface.

An actuating means 18 is connected to the undersurface of the body to effect the extension or retraction of the leg means 12 to brake or release the wheels accordingly. Referring to FIGS. 5 and 6, it will be seen that the actuating means 18 is operatively connected with each of the respective movable leg members 14 so as to effect simultaneous retraction or extension thereof.

The actuating means 18 in the illustrated form of the invention comprises a plurality of complementing plate members 19 and 20 wherein plate 19 is anchored or fixed to the undersurface of the table 10 and the other plate 20 being mounted for relative rotation with respect to the fixed plate about a central point. To minimize frictional resistance between the anchor plate 19 and the movable plate 20, a ring of ball bearings 22 is interposed therebetween.

In the illustrated form of the invention, the movable plate 20 is formed substantially rectangular in shape. Connected to each corner of the movable plate 20 is an operating link 23. Accordingly, one end of the link 23 is pivotally mounted about a suitable pivot pin 24 to the movable bearing plate 20. The other end of the link extends toward the respective leg means 12 of the table 10.

Referring to FIG. 2, it will be noted that a guide or bracket 25 is secured to the underside of the table 10 guidingly supporting an intermediate portion of the operating links 23 for movement toward and away from the respective leg means. Each of the respective fixed leg portions 13 is provided with an elongated slot 13A or opening opposite the free end of the associated link for reasons to be hereinafter set forth.

To effect simultaneous actuation of the slidable leg members 14 of the leg means 12 with respect to the fixed leg member 13 thereof between an extended and retracted position, complementary camming means are provided on the operating link and movable leg member of the associated leg means.

In the illustrated form of the invention, an angle member 26 is connected to the upper end of the movable leg member 14 of the respective leg means to define an inclined cam which extends through slot 13A. As seen in FIG. 2 the surface of the inclined cam inclines upwardly and to the right. Accordingly, a cam follower or roller 27 connected to the end of the associated operating link 23 is disposed in rolling engagement therewith. It will be noted that as the operating links 23 are moved toward their respective associated leg means 12, the coaction between the cam follower 27 and the inclined cam 26 is such that the table top 11 and the connected fixed leg portions 13 are upwardly displaced thereby causing the flared end 17 of the fixed leg member 13 to be raised above caster 15 thereby freeing the same for rotation.

Movement or actuation of the links 23 away from the respective leg means 12 cause the respective leg means 12 to retract, causing the weight of the table to frictionally lock or brake the casters 15.

Accordingly, as seen in FIG. 2, the weight of the table 10 causes the flared portion 17 of the fixed leg means 13 to engage the wheel means 15, and therefore function as a brake to prohibit rotation thereof. With the operating links 23 retracted to their inoperative position, as noted in FIG. 2, the table 10 is fixed or prohibited from rotating over the supporting surfaces as each of the respective caster means 15 are in a braking or non-rolling position due to the friction engagement of the flaring end portion 17 of the respective leg members 13 on the caster 15.

In order to effect simultaneous actuation of the respective operating links toward and away from the respective leg means, an operating lever 28 is connected to the bearing means 18. As shown, the operating lever 28 is connected to diametrically opposed pivot pins 24. Accordingly, it will be noted that movement of the actuating lever 28 in the direction of arrow 29 as noted in FIG. 5 will cause plate 20 to rotate clockwise about pivot 21 and the respective operating links to be simultaneously moved toward their respective associated leg means 12, thereby causing cam follower 27 on the free end thereof to ride up the surface of the associated inclined cam 26. In doing so, the table top 11 is displaced in an upward direction thereby causing the flared ends 17 of the fixed legs to disengage the caster for rotation. Actuation of the operating lever 28 in the opposite direction will effect simultaneous retraction of the respective operating links 23 to their inoperative position and in which position the weight of the table causes the flared ends of the fixed leg means to bear against to casters and function as a braking means therefor.

If desired, an idler roller 30 may be rotatably mounted on the respective links 23 intermediate the ends thereof so as to maintain the same in rolling engagement with the undersurface of the table top to further minimize sliding friction or play therebetween and thereby facilitate ease of movement therebetween.

It is to be noted that in the operative position, the cam follower 27 on the free end of the link 23 is disposed between the top of the movable leg member and the table top and thus provides a positive means for maintaining the legs in their respective extended position.

While the complementary camming means 26, 27 are illustrated as comprising a cam roller 27 fixed to the end of the connecting link and an inclined cam 26 as being fixed to the end of the movable leg member, it will be readily understood that the respective cam means can be interchanged without adversely effecting the operation; that is, the cam follower may be fixed to the movable leg members and the inclined plane can be connected to the end of the connecting link.

While the instant invention has been described with respect to a particular embodiment thereof, it will be readily understood and appreciated that variations and modifications may be made without departing from the spirit or scope of the invention.

What is claimed is:
1. A wheeled article comprising,
 (a) a body member having a top surface,
 (b) a plurality of leg means for supporting said body on a supporting surface,
 (c) each of said leg means including a first member fixed to said body, and a second member telescopically mounted with respect to each of said fixed members for relative movement between extended and retracted relationship with respect to said fixed member,
(d) wheel means connected to the end of said movable second member,
(e) actuating means operatively associated with said second member for simultaneously extending each of said leg means,
(f) said actuating means including a bearing means rotatably mounted on said body member for rotation in a plane parallel to said top surface,
(g) an operating link operatively connected between said bearing means and each of said second members of said leg means,
(h) each of said links and associated second leg members having complementary camming means whereby each of said leg means is extended when said actuating means is operated,
(i) and an operating lever connected to said bearing means at two spaced points to operatively rotate the same to effect retraction and extension of said wheel means.

2. An article of manufacture comprising,
a body,
a plurality of leg means connected to said body for supporting same on a surface,
each of said leg means including a tubular leg member fixed to said body,
a slidable leg member telescopically mounted on each of said tubular leg members for movement between an extended and a retracted position relative thereto,
a caster connected to each of said slidable leg members,
a brake means connected to the end of each fixed leg member adapted to frictionally brake said caster in the retracted position of said slidable leg member,
and said caster being free to rotate in the extended position of said slidable leg member,
an actuating means connected to said body, said actuating means being operatively connected with each of said leg means,
said actuating means including,
a bearing means connected to said body,
a plurality of actuating links connected to said bearing means,
each of said links extending between said bearing means and one of said leg means, and
cooperating camming means operatively connecting the free end of each link with the slidable leg member of the associated leg means,
and an operating lever connected to said bearing means to effect rotation thereof whereby the rotation of the bearing means in one direction effects the camming of said slidable leg members to extended position, and rotation of said bearing means in the opposite direction effects retraction of said leg means by the movement of said body,
said bearing means including, complementing bearing plates comprising,
an anchor plate fixed to said body,
a movable plate pivotally connected to said anchor plate, and
a bearing interposed between said plates,
said links have one end pivotally connected to the corners of said movable plate,
guide means connected to said body for guidingly supporting the intermediate length of each link,
and a camming means connected to the free end of said link.

3. The invention as defined in claim 2 wherein said camming means includes a cam roller, and a complementary inclined cam connected to said movable leg member disposed in engagement with said roller.

4. The invention as defined in claim 2 wherein,
(a) each of said fixed leg members is provided with a slotted opening for receiving the camming means connected to the associated link,
(b) and a complementary camming means connected to the slidable leg member to engage with the camming means of said link whereby said slidable leg is extended as said link is received through the slotted opening of said fixed leg.

5. An article of manufacture comprising,
(a) a body,
(b) a plurality of leg means connected to said body,
(c) each of said leg means including a tubular leg member fixedly connected to said body, and a slidably mounted leg member telescopically received within the associated fixed tubular leg member for movement between an extended and retracted position,
(d) a caster connected to the free end of said movable leg member,
(e) a braking means connected to the free end of said fixed leg member to frictionally brake said caster against rotation in the retracted position of said leg means,
(f) actuating means operatively connected to each of said slidable leg members to extend the same to release the braking action on said casters whereby said article is free to roll over a surface,
(g) said actuating means includes a bearing plate rotatably journalled to said body,
(h) a link connected between said plate and each of said slidable leg means,
(i) said link having one end pivotally connected to said plate and having its other end extended toward the associated leg means,
(j) each of said fixed leg members having a slotted opening adapted to receive the free end of the associated link,
(k) an inclined cam connected to each of said movable leg members,
(l) and a cam roller connected to the end of each link to engage with said inclined cam to cam said slidable leg member between extended and retracted position,
(m) and an operating lever connected to said bearing plate to effect displacement of said links toward and away from said associated leg means.

6. The invention as defined in claim 5 and including,
(a) a roller disposed intermediate the end of each link,
(b) said roller being disposed in rolling engagement with said body.

References Cited

UNITED STATES PATENTS

| | | |
|---|---|---|
| 141,236 | 7/1873 | Robertson. |
| 2,388,692 | 11/1945 | House _____ 188—74 X |
| 2,533,173 | 12/1950 | Mitchell _____ 108—130 |
| 2,655,387 | 10/1953 | Cramer. |
| 3,159,865 | 12/1964 | Shepherd _____ 188—1 X |

MILTON BUCHLER, *Primary Examiner.*

B. S. MOWRY, T. W. BUCKMAN, *Examiners.*